United States Patent
Ghosh et al.

(10) Patent No.: US 11,574,166 B2
(45) Date of Patent: Feb. 7, 2023

(54) METHOD FOR REPRODUCIBILITY OF DEEP LEARNING CLASSIFIERS USING ENSEMBLES

(71) Applicant: Hitachi, Ltd., Tokyo (JP)

(72) Inventors: Dipanjan Ghosh, Santa Clara, CA (US); Maria Teresa Gonzalez Diaz, Mountain View, CA (US); Mahbubul Alam, San Jose, CA (US); Ahmed Farahat, Santa Clara, CA (US); Chetan Gupta, San Mateo, CA (US); Lijing Wang, Fairfax, VA (US)

(73) Assignee: HITACHI, LTD., Tokyo (JP)

( * ) Notice: Subject to any disclaimer, the term of this patent is extended or adjusted under 35 U.S.C. 154(b) by 358 days.

(21) Appl. No.: 16/886,344

(22) Filed: May 28, 2020

(65) Prior Publication Data

US 2021/0374500 A1  Dec. 2, 2021

(51) Int. Cl.
*G06N 3/04* (2006.01)
*G06N 5/04* (2006.01)
*G06N 3/08* (2006.01)
*G06N 20/20* (2019.01)

(52) U.S. Cl.
CPC ............ *G06N 3/0454* (2013.01); *G06N 3/08* (2013.01); *G06N 5/04* (2013.01); *G06N 20/20* (2019.01)

(58) Field of Classification Search
CPC .......... G06N 3/0454; G06N 3/08; G06N 5/04; G06N 20/20; G06N 3/0445; G06N 3/082; G06N 7/005; G05B 23/0283; G06Q 10/20
See application file for complete search history.

(56) References Cited

U.S. PATENT DOCUMENTS

2021/0006342 A1*  1/2021  Zhao .................... H04W 16/14

OTHER PUBLICATIONS

Ren, Y. et al. "Ensemble Classification and Regression—Recent Developments, Applications and Future Directions" IEEE Computational Intelligence Magazine, Feb. 2016; pp. 41-53 (13 pages).
Ciresan, D. et al. "Multi-column Deep Neural Networks for Image Classification" Technical Report No. IDSIA-04-12, Feb. 2012 (20 pages).
Xie, J. et al. "Horizontal and Vertical Ensemble with Deep Representation for Classification" ICML Workshop on Representation Learning, 2013; Atlanta, Georgia, USA (6 pages).
Qiu, X. et al. "Ensemble Deep Learning for Regression and Time Series Forecasting" IEEE 2014 (6 pages).
Bonab, H. et al. "Less is More: A Comprehensive Framework for the Number of Components of Ensemble Classifiers" IEEE Transactions on Neural Networks and Learning Systems, Jul. 2018, vol. 14, No. 8 (10 pages).

(Continued)

*Primary Examiner* — Beemnet W Dada
(74) *Attorney, Agent, or Firm* — Procopio, Cory, Hargreaves & Savitch LLP

(57) ABSTRACT

Example implementations described herein involve systems and methods for generating an ensemble of deep learning or neural network models, which can involve, for a training set of data, generating a plurality of model samples for the training set of data, the plurality of model samples generated from deep learning or neural network methods; and aggregating output of the model samples to generate an output of the ensemble models.

9 Claims, 10 Drawing Sheets

(56) References Cited

OTHER PUBLICATIONS

Patil, P. et al. "Training replicable predictors in multiple studies" PNAS; Mar. 13, 2018; pp. 2578-2583; vol. 115, No. 11; (6 pages).
"Handbook of Mathematical Functions With Formulas, Graphs, and Mathematical Tables" National Bureau of Standards—Applied Mathematics Series; Jun. 1964; 470 pages.

* cited by examiner

METHOD FOR REPRODUCIBILITY OF DEEP LEARNING CLASSIFIERS USING ENSEMBLES

BACKGROUND

Field

The present disclosure is generally related to predictive maintenance, and more specifically, for reproducibility of deep learning classifiers through using ensembles.

Related Art

Maintaining equipment uptime has become increasingly important across different industries which seek for new ways of increasing equipment availability. By using predictive maintenance, one can increase equipment availability, improve the safety of operators, and reduce the environmental incidents. Maintenance is a process in which the objective is to keep the equipment in a working, efficient and cost-effective condition. The maintenance process is conducted by performing the necessary actions on the equipment to achieve one or more of these objectives. These actions include, but are not limited to, the inspection, tuning, repair and overhaul of the equipment or its components.

When complex equipment experiences a failure, it is sometimes difficult and time-consuming to diagnose the equipment, identify the root cause of the problem, and decide what repair actions need to be conducted to fix the equipment. Data generated during the maintenance operations can be used to develop data-driven systems for predictive maintenance that guide the maintenance staff on how to repair equipment when it is sent for repair. Deep learning or neural network model-based systems have been proposed for such systems, considering their ability to learn from massive amounts of data, different modalities of data and flexibility in developing different architectures. Periodic re-training of the model in the data-driven system can be important to incorporate recent maintenance actions.

However, re-training the models on new data can also lead to inconsistent repair actions given the same input data, primarily because of the change in the distribution of the training data and the randomness involved in the training process. Such inconsistencies can have serious repercussions as it can lead to faulty repairs, bad customer experience, penalties, equipment downtime because of incorrect repair, incorrect inspection, and so on. The same is true for other data-driven deep learning-based systems such as medical diagnosis and patient care recommendation systems, in which inconsistent output can have serious consequences.

SUMMARY

Consistent correct output (i.e., reproducible models) can increase reliability of the system, result in better customer satisfaction, and can result in improved equipment uptime because of a reduction in repeated repairs and reduction in maintenance operations time, thereby saving costs for the organization. Example implementations described herein are thereby directed to a mechanism with a foundation in deep learning/neural networks for developing a framework to optimize for accuracy and reproducibility as well if re-training is conducted through using the same data or through using different generations of data (changing data distributions). The improved accuracy and reproducibility of the framework also has theoretical guarantees and hence is a reliable system.

Example implementations described herein are directed to producing consistent and correct output across generations of models trained for multiple versions of historical data, where the problem is modelled as a classification problem and neural networks/deep learning is the algorithm used to solve the problem. For example, the implementations described herein are applicable to produce a consistent and correct course of repair actions after the equipment fails across generations of models trained for multiple versions of historical data. In other words, the example implementations described herein provide reproducible models that are not affected by the retraining process involving using new incremental data from one model generation to another.

The example implementations described herein address reproducibility in predictions across model generations faced by neural networks. Neural Networks (NN) training procedure inherently has randomness, which causes the optimization procedure to get stuck in low optima during the training process. This is one of the primary reasons why neural networks in general face the reproducibility issue. The example implementations described herein involve optimizing the network parameters, using the randomness to create multiple models forming an ensemble that is ultimately used for making predictions. This is in contrast to using a single model for predictions.

Neural network models can take long time to train, thus, the example implementations described herein are directed to not increasing the time to create an ensemble. The time required to create a single model and an ensemble remain the same using the example implementations. The system to recommend a course of repair actions, failure prediction, defect identification using visual inspection are problems modelled as a classification problem wherein the labels are obtained from historical data. The system to create an ensemble of models to solve reproducibility is not restricted to the system of recommending repair actions or failure prediction. but is also applicable for all problems modelled as classification and using NN as the algorithm. Throughout the disclosure herein, Neural Networks (NN) and Deep Learning (DL) may be used interchangeably.

The example implementations described herein can involve model reproducibility for each input across multiple generations of the model using an ensemble of model. Example implementations involve reproducibility across multiple generations of a model and the present disclosure provides definitions for various terminologies that are utilized to solve reproducibility. The example implementations involve a system with a basis in NN/DL to solve reproducibility using multiple models together (i.e., an ensemble of models). The system will provide a mechanism to combine outputs from multiple models in the ensemble to create a single output. As will be described herein, a mathematical proof is provided to demonstrate that the ensemble of models improves reproducibility.

The example implementations further involve a dynamic creation of multiple trained models without increasing the training time forming an ensemble of models to improve reproducibility for each input across multiple generations of the model. With the assumption that the problem to recommend a course of repairs has been modelled as a classification problem involving the presence of historical repair data, the example implementations dynamically create multiple models to form an ensemble. The example implementations also work for the assumption that a problem has been modelled as a classification problem in general and has historical data (for example, an image classification problem).

Based on an input specification (e.g., base architecture stack-up), the example implementations will create the network architecture that involves Convolutional Neural Network (CNN), Long Short-Term Memory (LSTM), multi-layer fully connected neural network (MNN), or any combination of CNN, LSTM and MNN.

The example implementations also involve two basic variations to create multiple models: (a) Sampling multiple models during the model training procedure and using the sampled models during model inference to create outputs and combine them, (b) Creating different architectures using the base architecture stack-up and trained model parameters during model inference time to create outputs and combine them, (c) a combination of (a) and (b) to create an ensemble with greater variety of models. The focus of (a) is on creating multiple models by sampling different model parameters which represent different local optima. The focus of (b) is to develop and incorporate different network structures altogether thus forming different models. By combining (a) and (b) models with varying structures and varying parameters can be obtained, thus creating a wide variety of models.

Because of the intelligent sampling of model parameters during model training and intelligent creation of multiple architectures during model inference, the model training time does not get increased. The model training time is same as developing a single model as in the traditional and predominant model training procedures.

The example implementations also involve improving accuracy and reproducibility for predictions associated with under-represented classes in cases when the data is imbalanced. While developing models to recommend a course of repairs or to solve a classification problem, some classes/labels in the data can become under-represented. This is known as the imbalanced data problem. In such situations, a single model (traditional approach) under-performs in the under-represented classes. For example, in the case of recommending repairs, a single model performs poorly (accuracy and reproducibility) for rare repair cases. The example implementations described herein improves the accuracy as well as reproducibility on the under-represented classes.

Ensemble in DL/NN have mostly been used to increase accuracy. Further, currently in DL/NN and machine learning art, reproducibility refers to the replication of experiments and the results obtained. Producing the same correct output for every input using models trained on multiple generations of dataset has not been considered in the related art. Using ensemble DL method to achieve individual record level reproducibility has also not been considered in the related art. Further, all DL/NN require long training time, however, the example implementations obtain an ensemble of models to address reducibility without increasing the training time, which has not been considered in the related art.

Aspects of the present disclosure involve a method of generating an ensemble of deep learning or neural network models, the method involving for a training set of data, generating a plurality of model samples for the training set of data, the plurality of model samples generated from deep learning or neural network methods; and aggregating output of the model samples to generate an output of the ensemble models.

Aspects of the present disclosure involve a non-transitory computer readable medium, storing instructions for generating an ensemble of deep learning or neural network models, the instructions involving for a training set of data, generating a plurality of model samples for the training set of data, the plurality of model samples generated from deep learning or neural network methods; and aggregating output of the model samples to generate an output of the ensemble models.

Aspects of the present disclosure involve a system for generating an ensemble of deep learning or neural network models, the system involving for a training set of data, means for generating a plurality of model samples for the training set of data, the plurality of model samples generated from deep learning or neural network methods; and means for aggregating output of the model samples to generate an output of the ensemble models.

DETAILED DESCRIPTION

Figure 1:
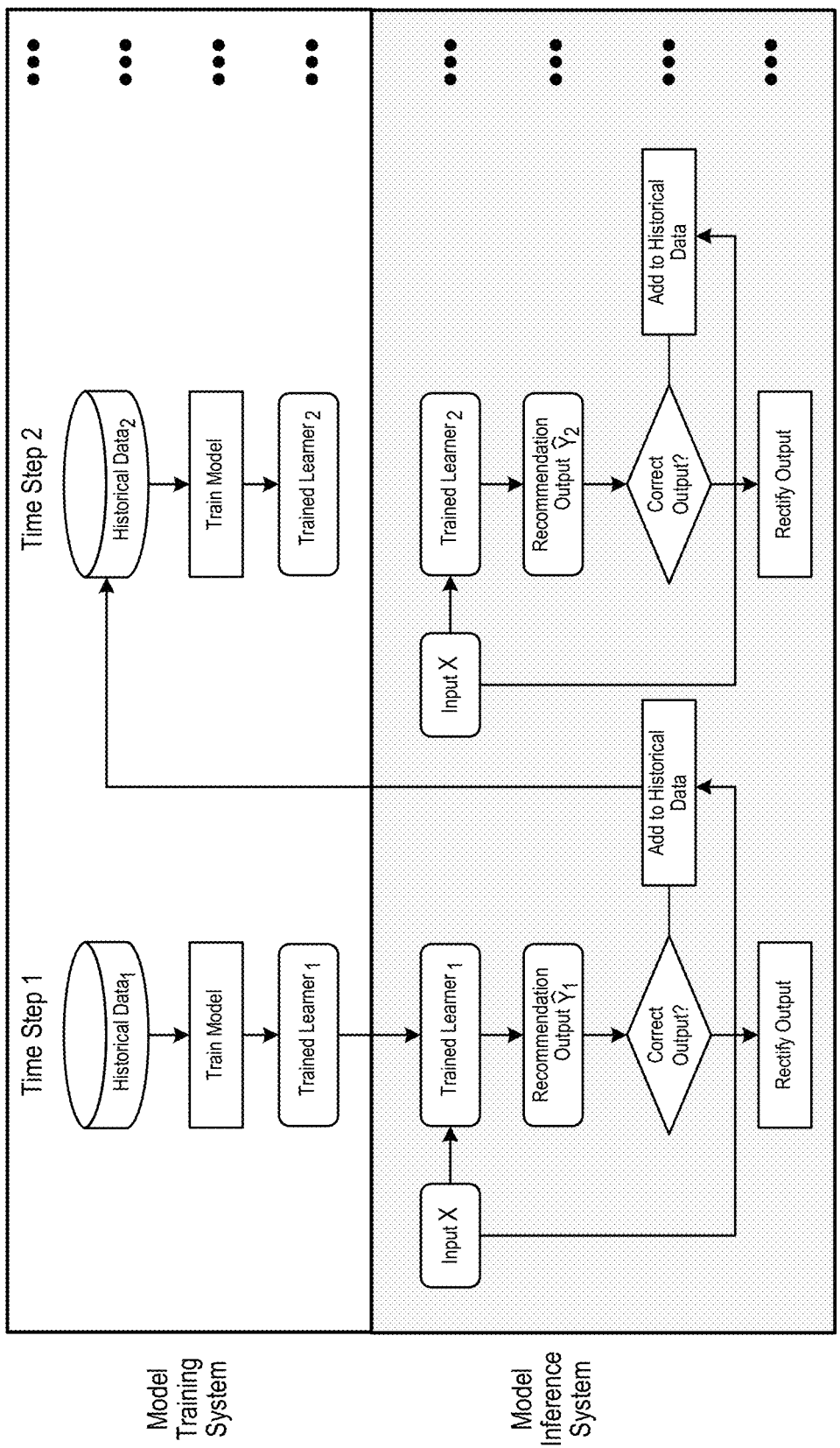
FIG. 1 illustrates the process of deployment of a model to recommend a course of repairs on field, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Equipment uptime is getting increasingly important across different industries which seek for new ways of increasing equipment availability. Neural network-based models deployed on field require periodic re-training. Due to the inherent randomness, different generations of the model suffer through in-consistent or non-reproducible correct output. Consistent output is very important for critical applications like repair recommendation, failure prediction, and so on.

Example implementations described herein involve a method in which multiple trained models form an ensemble to improve consistency and produce reproducible models.

The example implementations can be used to develop a reliable, highly accurate and highly reproducible repair recommendation system, failure prediction and defect identification using a neural network based visual inspection system.

Example implementations described herein are directed to a system that generates an ensemble of DL/NN models for problems modelled as classification tasks, e.g., a system that recommends a course of repair actions after an equipment fails. The system described herein does not increase the training time in comparison to generating a single model. The system described leads to increase in reproducibility and also accuracy in under-represented classes.

As described herein, several definitions are used, and a system/algorithm description and a mathematical proof is provided to show that an ensemble of models increase in reproducibility.

In the following present disclosure, the following definitions are utilized.

Architecture: An assumption is that the problem to be solved is modelled as a classification problem, e.g., to recommend a course of repair actions. The classification problem is being solved using a Neural Network or Deep Learning. The architecture/base architecture is defined as a stack-up of modules which can include, but are not limited to, convolutional neural networks (CNN), long shot-term memory (LSTM), multi-layer fully connected networks (MNN), or any combination thereof.

Model: A model is defined as an architecture built for a learning task. A task is the problem being solved and is modelled as a classification problem.

Training process: the process used to find the optimum set of parameters of the model.

Trained learner: a trained learner is the predictor of a model after one training cycle (i.e. it is the set of parameters that is learned after one training cycle). Thus, given a model, it can have multiple trained learners by having multiple training cycles.

Copy of trained learners: Given a model, and one of its trained learners, a copy of the trained learner is the one that trained with the same model setting. Thus, all trained learners of the model can be called a copy of each other provided the model settings are the same.

Inference phase/process: The process of using a trained learner and passing an input through the trained learner.

Deterministic trained learners: In NN/DL models, usually the training process is stochastic while the trained learners are deterministic. This means given a DL model, different trainer learners are obtained after different training cycles, even on the same training dataset. However, given a trained leaner, it will always output the same prediction on an input (i.e., the trained learners are deterministic).

Non-deterministic trained learners/varying architecture trained learner: In DL/NN during the training process one of the stochastic components is the use of dropout in general is used for regularization. The dropout is a stochastic parameter which creates masking effects that leads of certain connections in the NN being inactive. This effect is altering the architecture/base architecture. In DL, during the training process this stochastic parameter called as dropout is active while during inference phase is kept inactive. During the inference phase, there can be non-deterministic trained learners/varying architecture trained learners and trained learners but with dropout being active. Hence, the same input passed through the trained learners will lead to different outputs if passed through a multiple number of times.

Reproducibility of a model: The reproducibility of a model is defined by the ability to reproduce a single prediction of the same input with its multiple trained learners. For example, two trained learners A and B output $\hat{Y}_A$ and $\hat{Y}_B$ on the same input respectively, if $\hat{Y}_A = \hat{Y}_B$ and regardless as to whether it is correct or not, the model reproduces the prediction on that input.

Below are the notations used throughout the present disclosure:

i. $C = \{C_1, C_2, \ldots, C_p\}$: Classification problem with p labels, $C_k$: $(1 \leq k \leq p)$ and $(2 \leq p)$ ii. $D = \{D_1, D_2, \ldots, D_T\}$: Increasing training dataset where $D_1 \subseteq D_2 \subseteq \ldots D_T$ iii. $I = \{I_1, I_2, \ldots, I_n\}$: Data point, $I_t$: $(1 \leq t \leq n)$ iv. $r_t = \langle R_t^1, R_t^2, \ldots, R_t^p \rangle$: Ground truth/label one-hot vector for $I_t$ v. $\xi = \{SL_1, SL_2, \ldots, SL_m\}$: Ensemble of m component single learners, $SL_j$; $(1 \leq j \leq m)$ and $(2 \leq m)$ vi. $\widetilde{\xi} = \{\widetilde{SL}_1, \widetilde{SL}_2, \ldots, \widetilde{SL}_m\}$: The copy of $\xi$, ensemble of m component single learners, $\widetilde{SL}_j$; $(1 \leq j \leq m)$ and $(2 \leq m)$ vii. $s_{tj} = \langle S_{tj}^1, S_{tj}^2, \ldots, S_{tj}^p \rangle$: Probability-vector of $I_t$ and $SL_j$; $\Sigma_{k=1}^p S_{tj}^k = 1$ viii. $\tilde{s}_{tj} = \langle \tilde{S}_{tj}^1, \tilde{S}_{tj}^2, \ldots, \tilde{S}_{tj}^p \rangle$: Probability-vector for $I_t$ and $\widetilde{SL}_j$; $\Sigma_{k=1}^p \tilde{S}_{tj}^k = 1$ ix. $o_t = \langle O_t^1, O_t^2, \ldots, O_t^p \rangle$: Centroid-point vector for $I_t$ and $\xi$, $O_t^k$; $(1 \leq k \leq p)$ x. $\tilde{o}_t = \langle \tilde{O}_t^1, \tilde{O}_t^2, \ldots, \tilde{O}_t^p \rangle$: Centroid-point vector for $I_t$ and $\xi$, $O_t^k$; $(1 \leq k \leq p)$ xi. $w = \langle W_1, W_2, \ldots, W_m \rangle$: Weight vector for $\xi$, $W_j$; $(1 \leq j \leq m)$ xii. $u_t = \langle \tilde{U}_t^1, \tilde{U}_t^2, \ldots, \tilde{U}_t^p \rangle$: Weighted centroid-point vector for $I_t$ and $\xi$ and w, $\tilde{U}_t^k$; $(1 \leq k \leq p)$ xiii. $\tilde{u}_t = \langle \tilde{U}_t^1, \tilde{U}_t^2, \ldots, \tilde{U}_t^p \rangle$: Weighted centroid-point vector for $I_t$ and $\xi$ and w, $\tilde{U}_t^k$; $(1 \leq k \leq p)$ xiv. $\zeta = f(w, \xi)$: Combination learner for $\xi$ and w FIG. 1 illustrates the process of deployment of a model to recommend a course of repairs on field, in accordance with an example implementation. The model is trained repeatedly on each new training data set and obtains a trained learner for each training. Each trained learner takes X as input and predicts $\hat{Y}$ as the output. The system developed herein has the goal to improve the reproducibility of the model (i.e. reproducibility between $\hat{Y}$s) as well as maintain or improve the accuracy, which is evaluated by the reproducibility and accuracy. Similar procedure is applicable for other classification tasks as well.

Below are the metric definitions used herein:

i. $\text{Reproducibility} = \dfrac{\text{Number of matching pairs from two learners}}{\text{Total number of predictions}}$ $$ii.\ \text{Accuracy} = \frac{\text{Number of correct predictions}}{\text{Total number of predictions}}$$

$$iii.\ \text{Correct} - \text{Reproducibility} = \frac{\text{Number of correct and matching pairs from two learners}}{\text{Total number of predictions}}$$

Suppose there are two learners A and B, the predictions of A, B for a data point $I_t$ is denoted as $y_t^A$ and $y_t^B$. Here A, B could be any single learner or ensemble learners, and $y_t^A$, $y_t^B$ could be the single prediction or combined prediction for $I_t$ with true label $r_t$. Define indicator functions $1_{AB}(\bullet)$ and $1_{A,B,r_t}(\bullet)$ which is a function to output 0 or 1 depending on conditions:

$$1_{A,B}(t) = \begin{cases} 1, & \text{if } \operatorname{argmax}(y_t^A) = \operatorname{argmax}(y_t^B) \\ 0, & \text{otherwise} \end{cases}$$

Where argmax(•) returns the index of max value in a list, which indicates the class label. And $$1_{A,B,r}(t) = \begin{cases} 1, & \text{if } \operatorname{argmax}(y_t^A) = \operatorname{argmax}(y_t^B) = \operatorname{argmax}(r_t) \\ 0, & \text{otherwise} \end{cases}$$

The top-k indicator function is defined as:

$$1_{AB}^{ik}(t) = \begin{cases} 1, & \text{if } \exists\, 0 \le i, j \le k \text{ that } \operatorname{argmax}_i(y_t^A) = \operatorname{argmax}_j(y_t^B) \\ 0, & \text{otherwise} \end{cases}$$

Where $\operatorname{argmax}_i(\bullet)$ returns the index of the i-th max value in a list. $1_{A,B}(\bullet)$ is a specific case of $1_{A,B}(\bullet)$.

The top-i-in-k indicator function is defined as:

$$1_{A,B}^{ik}(t) = \begin{cases} 1, & \text{if } \exists\, 0 \le j \le k \text{ that } \operatorname{argmax}_i(y_t^A) = \operatorname{argmax}_j(y_t^B) \\ 0, & \text{otherwise} \end{cases}$$

To consider on-hot vector in ground truth, define another top-k indicator function which is defined as:

$$1_{A,r}^{k}(t) = \begin{cases} 1, & \text{if } \exists\, 0 \le i \le k \text{ that } \operatorname{argmax}_i(y_t^A) = \operatorname{argmax}(r_t) \\ 0, & \text{otherwise} \end{cases}$$

Based on the above definitions, for the testing data set I, during the inference phase, the metrics used to evaluate the reproducibility and accuracy are computed as:

i. Exact—Reproducibility $$(ER) = \sum_{t=1}^{n} 1_{A,B}(t)$$

ii. Coarse—Reproducibility $$(CR) = \frac{1}{k*n}\sum_{t=1}^{n}\sum_{i=1}^{n} 1_{A,B}^{i,k}(t)$$

iii.

$$\text{Cosine Similarity between two vectors} = \frac{1}{n}\sum_{t=1}^{n} \frac{\sum y_t^A y_t^B}{\sqrt{\sum (y_t^A)^2}\sqrt{(\Sigma(y_t^B)^2}},$$

where $\Sigma y_t^A y_t^B$ denotes the summation of the element-wise products.

iv. Exact Accuracy $$(EA) = \frac{1}{n}\sum_{t=1}^{n} 1_{A,r}(t)$$

v. Coarse Accuracy (CA), also called $$\text{Top-}K\ \text{accuracy} = \frac{1}{n}\sum_{t=1}^{n} 1_{A,r}^{k}(t)$$

vi. Correct—Reproducibility $$(EA\text{-}ER) = \frac{1}{n}\sum_{t=1}^{n} 1_{A,B,r}(t)$$

At an abstract level, the methodology is composed of various steps, including intelligent sampling of trained learners during the model training process, incorporating trained learners from different generations of training dataset, dynamic generation of multiple architectures of the trained learner/s during the inference process, combining output from multiple learners to form a single output.

To demonstrate the working of the methodology at an abstract level, the examples described herein are described with respect to Recommending Course of Repair Actions or Repair Recommendation (RR) after a system has failed. To demonstrate that the method is also applicable for classification task, the workings on the methodology to create ensemble is explained in detail herein using CIFAR-10 as the dataset.

Recommending repairs involves incorporating information from natural language complaints from users, information regarding the equipment, information regarding the usage of the equipment, sequence of events and sensor data. Accurate and reproducible outputs can be important for this application, because technicians will ultimately use the recommendations and apply it to the equipment. Inconsistent recommendations may lead to incorrect repair actions that can be fatal, customer dissatisfaction as well as technician's distrust in the repair recommendation system. As an example, a repair recommendation machine learning model is trained every month by incorporating the new data obtained. The resulting model of each month can be called as a generation of the model or a version of the model. If for the same input, two generations/versions of the model trained in two subsequent months produces different outputs, it can create confusion for the technicians, distrust in the system as well as faulty repairs. Hence, reproducibility in such systems is of paramount importance. To recommend accurate as well as reproducible repair actions the following steps should be executed.

Data Preparation

For repair recommendation, the data input is a set of natural language user complaints, information regarding the equipment, information regarding usage (equipment usage) of the equipment (equipment attributes), sensor data and sequence of events. The repair recommendation model uses neural networks/deep learning algorithms. Several steps are necessary to perform before the data is used as an input to the deep learning algorithm. We have leveraged the data processing from the previous contributions to the repair recommendation systems. For problems other than repair recommendation that are modelled as classification, example—failure prediction/fault detection, relevant data preparation steps should be applied to the input data before it is ingested in the deep learning algorithm.

As an example, for repair recommendation the following steps are conducted for data preparation: Noise/outlier removal from equipment attributes, equipment usage, sensor data, missing data imputation for sensor data, extraction of text from handwritten notes using optical character recognition, extracting text from voice notes using text-to-speech algorithm, special character removal, stop word removal, normalization of abbreviations, normalization of synonyms, text correction, stemming of the extracted text data, noise removal, removal of repair mistakes from the repair data.

Once data is prepared, it is further divided into a training and validation set. The training set is used during the model training phase, while the validation set is used for evaluating the model and calculation of various metrics as defined above.

Defining the Base Architecture of the Deep Learning Mode

In the present disclosure, the existing concepts in deep learning network architectures are leveraged. These include convolutional neural networks, LSTM networks and fully connected neural networks. As the first step, a user-defined base architecture stack-up is created. The base architecture stack-up for this work is defined as the relationship between the inputs, the different layers (convolutional, LSTM, fully connected), relationship between convolutional layer, LSTM layer and fully connected layers. The base architecture involves many architectural hyper-parameters. These include, but are not limited to, the number of convolutional layers, number of convolutional filters, convolutional filter size, number of LSTM layers, number of LSTM nodes, number of fully connected layers, number of fully connected hidden nodes, dropout rate at each layer, number of epochs for training, etc. Using traditional techniques these hyper-parameters can be optimized using a training dataset for a single trained learner. The methodology is not for finding the optimum hyper-parameters for a trained learner. If there exists a single trained learner, those hyper-parameter settings can be used as the base architecture stack-up. The base architecture stack-up is equivalent to the model as defined above.

Figure 2:
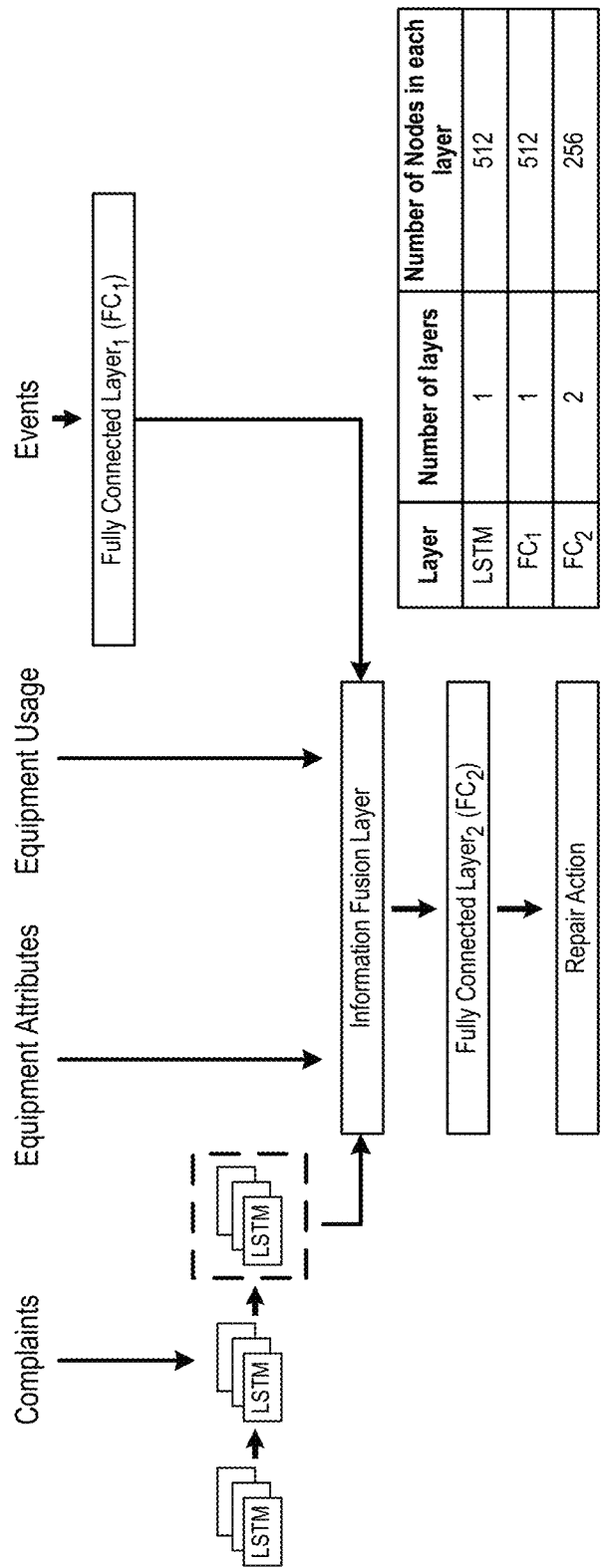
FIG. 2 illustrates an example base architecture/model for repair recommendation, in accordance with an example implementation.

FIG. 2 illustrates an example base architecture/model for repair recommendation, in accordance with an example implementation. In FIG. 2, the free text user complaints information flows through a LSTM layer, the equipment events flow through a fully connected layer and finally the output of these is combined with the equipment attribute information, equipment usage information which later flows through multiple fully connected. FIG. 2 illustrates hyper-parameters that were optimized using a training process for a trained learner using existing state-of-the-art methods. This stack-up forms the base architecture/stack-up, i.e., the model. Every time this model is trained using a training dataset, a trained learner is formed with same hyper-parameters, but different model parameter values because of the stochasticity in the training process.

Sampling Trained Learners During Training Phase

There are multiple ways to create multiple trained learners from the training data during the training phase to form an ensemble. Such methods can include the following.

Sampling training data: The trained learners of a given model that are trained on different training data sets can be used as the member/component of an ensemble. The k-fold cross-validation is a method that is normally used for validation of a model can be reused to create different trainer learners, each forming a component of the ensemble. Further, in practice single trained learners are formed periodically based on new historical data, thus forming multiple versions/generations of trained learners. Hence, each generation/version of trained learner can be considered a result of training a model using sampled training data. Thus, past 'X' generations/versions of trained learners can be considered as components of an ensemble.

Varying model hyper-parameters: Instead of varying the training data, we can vary the model hyper-parameters itself. By varying hyper-parameters, different single trained learners can be obtained, forming a component of an ensemble.

Varying model random initialization of model parameters: Instead of varying the training data, the model parameter initialization itself can be varied. By varying random initialization of model parameters, different single trained learners can be obtained, forming a component of an ensemble.

Sampling trained learners during training phase in the optimization loop: There is a scope to sample multiple trained learners during the optimization loop used during the training procedure. This can be done by periodically sampling trained learners during the optimization loop, modifying the optimization procedure to have oscillating learning rates.

The above ways of creating multiple single learners forming an ensemble will result into a deterministic trained ensemble learner during the inference phase. This is because the dropout is kept inactive during the inference phase. Each trained learner can be modified to a stochastic one by keeping the dropout active during the inference phase. Thus, when an input is passed multiple number of times through the trained learner with dropout active, the network structure is modified randomly during each pass and different outputs can be obtained. Each randomly modified structure of the trained learner is a component of the ensemble.

Figure 3:
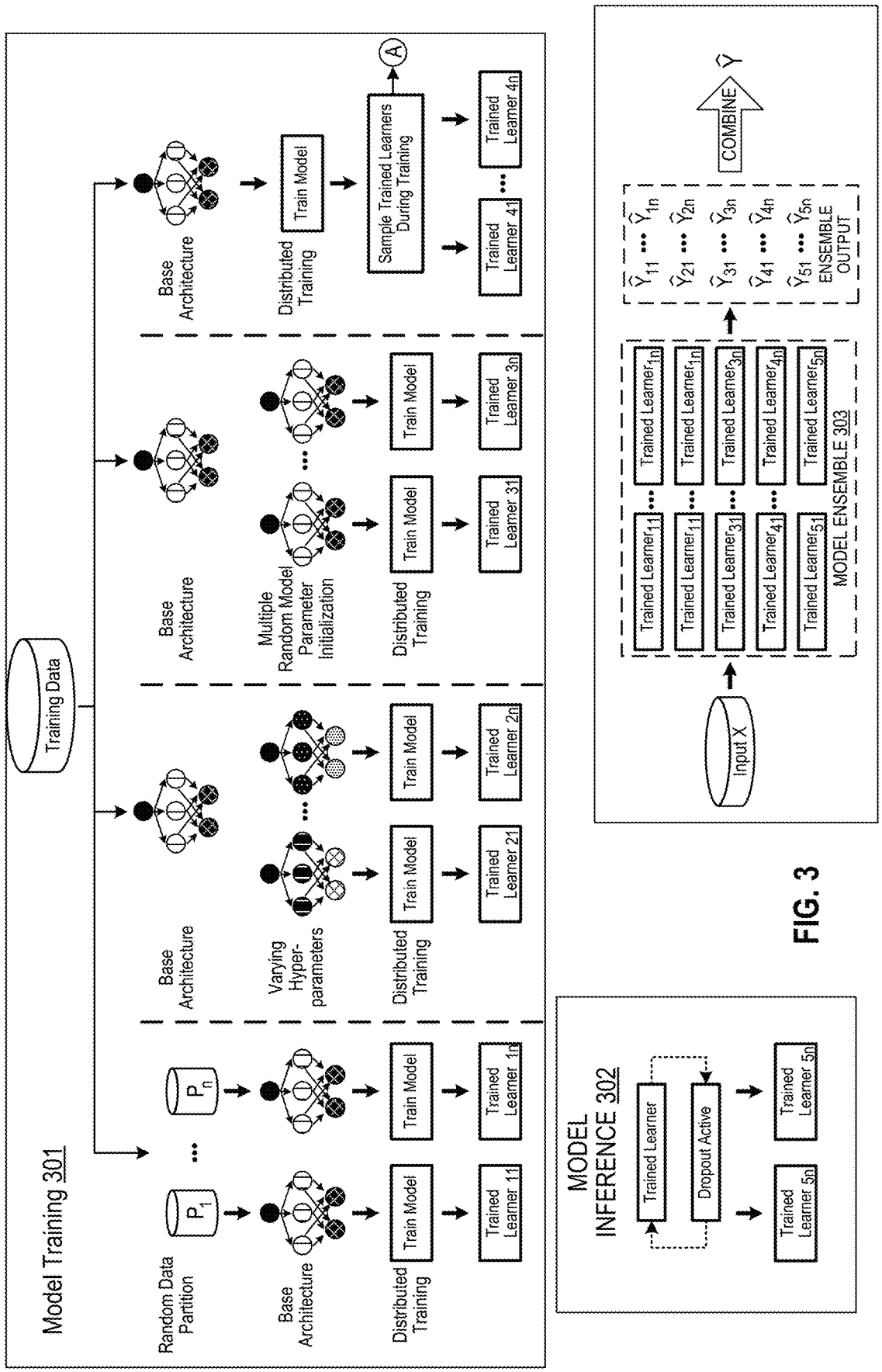
FIG. 3 illustrates an example of the ensemble creation process, in accordance with an example implementation.

FIG. 3 illustrates an example of the ensemble creation process, in accordance with an example implementation. As shown in FIG. 3, ensemble creation during model training procedure is shown in 301, and during inference is shown in 302. The usage of an ensemble of trained learners is shown in 303. During the training procedure, an ensemble is created using four methodologies—random splitting of training data, random variation in hyper-parameters, random multiple initializations and sampling of trained learners during the model training process.

During the inference process, an ensemble is created by random masking the model architecture using the active dropout mechanism. The set of trained learners forms the ensemble. When an input is passed, the input is passed through all the trained learners and creates an output, $\hat{Y}_{mn_m}$, where m is the ensemble creation method and $n_m$ is the trained learner component associated with each ensemble creation method. It should be noted that the number of component trainer learners for each ensemble creation method can be different. Finally, the outputs from each component $\hat{Y}_{mn_m}$, are combined into a single output $\hat{Y}$ using established aggregation methods like majority-voting, weighted-voting, averaging, weighted-averaging. Through such example implementations, the utilization of the ensemble of trained learners improves reproducibility and accuracy irrespective of the aggregation method used.

Example implementations described herein involve a method to create an ensemble of trained learners using an example of a classification task using the CIFAR-10 dataset. It should be noted that the method is transferable to any problem modelled as classification and solved using neural networks, for example, repair recommendation, failure prediction, and so on.

As is known in the art, the CIFAR-10 dataset consists of 60,000 images. The resolution of each image is 32×32. The dataset consists of 10 classes, with 6,000 images per class. The classes include airplane, automobile, bird, cat, deer, dog, frog, horse, ship, truck, and so on. There are 50,000 training images and 10,000 test images. The classes are completely mutually exclusive. There is no overlap between automobiles and trucks. Automobiles includes sedans, SUVs, and so on. Trucks include big trucks. Neither includes pickup trucks.

The task to solve is to classify a given image into one of the ten classes. Thus, this problem is modelled as a classification algorithm.

Data Cleaning and Preprocessing

The first step for each dataset based on the problem be solved is to go through data cleaning and pre-processing steps. These steps can include, but are not limited to normalization, outlier removal, text pre-processing (stop word removal, synonym conversion, lemmatization, abbreviations), image processing (noise removal, RGB to black and white image conversion, YUV plane conversion), various encodings (one-hot encoding, hashing, text to indices), data augmentation techniques, and so on. These techniques and its variants are based on the domain, problem being solved, and data generated based on the dynamics of the process. There is a possibility that the dataset is already cleaned or processed, hence sometimes data cleaning, however, it is highly recommended.

CIFAR-10 is a relatively well cleaned dataset, hence cleaning has not been necessary. However, preprocessing steps where conducted. Each pixel in an image was normalized from 0 to 1 value. The output class was encoded into a one-hot coded vector using one-hot encoding mechanism.

The second step is to explore and define a base architecture to reach a desired level of accuracy. It should be noted that the following description is not to explore and define base architecture to reach desired level of accuracy. Rather the example implementations described herein utilize a base architecture already explored and improve reproducibility across multiple generations of models. For CIFAR-10, a base architecture defined by a model architecture called as ResNet20 can be utilized.

An example base architecture is shown in Table 1:

TABLE 1

Base Architecture/Model of CIFAR-10

| Layer Name | Layer Type | Kernel Size | # of Channels | Activation | Connected to |
|---|---|---|---|---|---|
| Input Layer | Input Layer | 32 × 32 | 3 | — | — |
| Conv_1 | Convolutional | 3 × 3 | 16 | ReLU | Input Layer |
| Conv_2 | Convolutional | 3 × 3 | 16 | ReLU | Conv_1 |
| Conv_3 | Convolutional | 3 × 3 | 16 | ReLU | Conv_2 |
| Conv_4 | Convolutional | 3 × 3 | 16 | ReLU | Conv_3 |
| Conv_5 | Convolutional | 3 × 3 | 16 | ReLU | Conv_4 |
| Conv_6 | Convolutional | 3 × 3 | 16 | ReLU | Conv_5 |
| Conv_7 | Convolutional | 3 × 3 | 16 | ReLU | Conv_6 |
| Conv_8 | Convolutional | 3 × 3 | 16 | ReLU | Conv_7 |
| Conv_9 | Convolutional | 3 × 3 | 16 | ReLU | Conv_8 |
| Conv_10 | Convolutional | 3 × 3 | 16 | ReLU | Conv_9 |
| Conv_11 | Convolutional | 3 × 3 | 16 | ReLU | Conv_10 |
| Conv_12 | Convolutional | 3 × 3 | 16 | ReLU | Conv_11 |
| Conv_13 | Convolutional | 3 × 3 | 16 | ReLU | Conv_12 |
| Conv_14 | Convolutional | 3 × 3 | 16 | ReLU | Conv_13 |
| Conv_15 | Convolutional | 3 × 3 | 16 | ReLU | Conv_14 |
| Conv_16 | Convolutional | 3 × 3 | 16 | ReLU | Conv_15 |
| Conv_17 | Convolutional | 3 × 3 | 16 | ReLU | Conv_16 |
| Conv_18 | Convolutional | 3 × 3 | 16 | ReLU | Conv_17 |
| Conv_19 | Convolutional | 3 × 3 | 16 | ReLU | Conv_18 |
| Conv_20 | Convolutional | 3 × 3 | 16 | ReLU | Conv_19 |
| Conv_21 | Convolutional | 3 × 3 | 16 | ReLU | Conv_20 |
| Pool_1 | Pool (Max) | — | — | — | Conv_21 |
| Dropout_1 | Dropout (0.8) | — | — | — | Pool_1 |
| Output Layer | Output Layer | 10 | 1 | Softmax | Dropout_1 |

Examples of the hyper-parameters as part of the base model are as shown in Table 2.

TABLE 2

Hyper-parameter values

| Hyper-Parameter | Parameter Value |
|---|---|
| Batch size | 128 |
| Epochs | 300 |
| Initial learning rate | $1.00e^{-3}$ |

Ensemble Component Creation During Model Training

In example implementations, an ensemble of trained learners are created during the model training method using methods such as random split of training data, random variations in hyper-parameters, random initializations of the base model parameters, sampling during model training, and so on. Each method can generate any number of trained learner components. To prevent the increase in training time to create the ensemble, example implementations utilize the distributed training method (i.e., each trained learner component is obtained by training on a separate server(s) with one or more Graphics Processing Units/Tensor Processing Units (GPUs/TPUs) simultaneously. This way, the training time is not increased even for very large models.

In the case of CIFAR-10, each method generates five trained model components. For example, the method of random splitting the training data will generate five models and the distributed training strategy can be used as mentioned above.

Ensemble Component Creation Using Random Splitting of Training Data

During the model training procedure, the training data is further randomly divided into a training and validation dataset. The training data is used to fine tune/learn the parameters of the base architecture using an optimization method (e.g. ADAM, Stochastic Gradient Descent), while the validation dataset is used to select the best trained learner during the training procedure. For ensemble creation using this methodology, example implementations randomly split the training data in training and validation dataset multiple number of times defined by the desired number of component trained learners to be obtained. Thus, for every trained learner component to be obtained we have a different training dataset. Considering that the example implementations utilize an optimization algorithm to learn the parameters of the model, for each training dataset we learn a different set of parameters.

In the case of CIFAR-10 dataset, the examples herein divide the training dataset into a training dataset using 90% of the training data, and validation set using 10% of the training data. As the number of trained learner components is defined to be five, the examples perform this procedure five times, thus forming five sets of training and validation data. As the CIFAR-10 has 50,000 training data, post splitting the examples result in five sets of 45,000 training dataset and 5,000 validation dataset. Using the base architecture and going through the model training procedure, the examples obtain five trained learners.

Ensemble Component Creation Using Varying Hyper-Parameters

Neural networks training procedures involve multiple hyper-parameters. These include, but are not limited to, batch size, number of epochs in the optimization algorithms, optimization algorithms, and so on. Each random variation of these hyper-parameters results into model training setting, thus resulting into a different trained learner. Ideally, the same split of training data and validation data should be preserved across each random variation of hyper-parameter. However, depending on the desired implementation, the split of training data and validation data can change with each variation of hyper-parameter as well.

In the case of CIFAR-10 dataset, the examples obtained five random variations of batch size, epochs and initial learning rate to obtain five trained component learners.

Ensemble Component Creation Using Varying Model Initializers

The first step of the neural networks training procedure involves model parameter initialization. This initialization is strongly dependent on the random seed being used; however, it is not restricted to that. Based on the number of trained learner components to be obtained, one can randomly sample random seeds from a range of seed values and use them during model parameter initializations. If there are other parameters which control the random initialization, then varying those is also a valid option.

In the case of CIFAR-10 dataset, the examples obtained five random variations of random seeds—22,34,46,58,60 and used for five model parameter initializations, thus five trained learner components.

Ensemble Component Creation Sampling Trained Learners

Figures 4A, 4B, 4C:
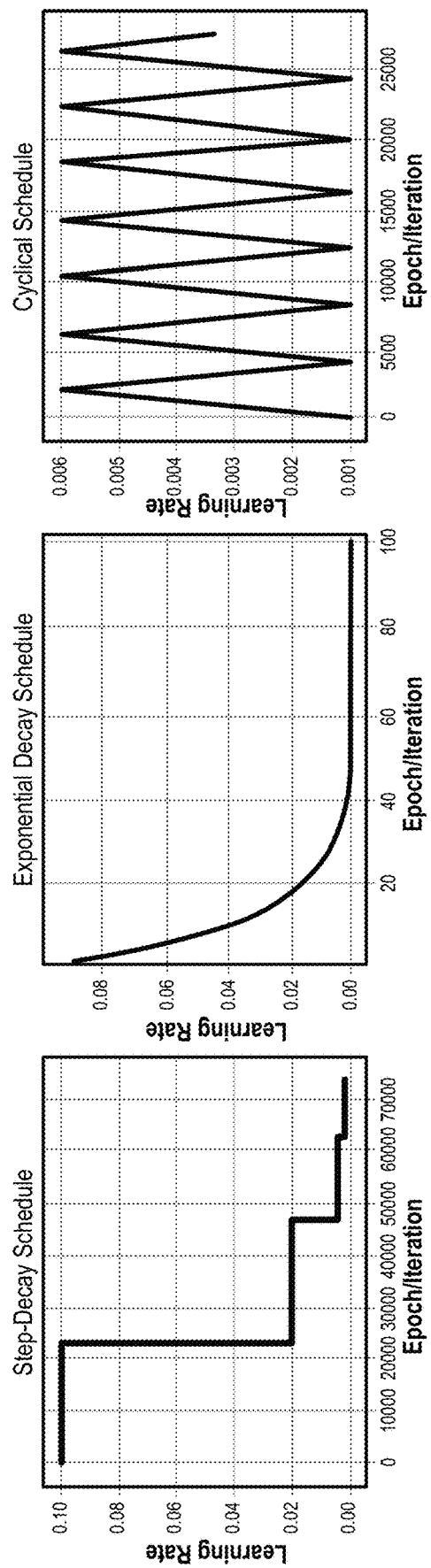
FIGS. 4(a) to 4(c) illustrate an example of a traditional learning rate update schedules, and also cyclical update schedule.

During the training procedure of a neural network, the parameters are updated using a learning rate for each mini-batch iteration. Because of this, the prediction/classification error of the neural network decreases. By keeping the number of epochs in the optimization procedure constant, there is an opportunity to sample trained learners during the same training procedure. Each sampled trained learner is stuck at a local minimum, hence representing a different model. In example implementations described herein, there are three methods to sample trained learners as shown below:

Method 1 (Snapshot-A): To avoid learning stagnation, the learning rate is decreased using some mechanism on a periodic basis. However, the basic principle that remains constant is that the learning rate has to decrease so that the neural network does stagnate or get stuck in local minima. However, during the same training procedure, the example implementations let the neural network converge M times to local minima along its optimization path by using a cosine cyclic annealing learning rate schedule. Other cyclical schedules are also appropriate. This is a deviation from the traditional way of learning rate update schedule as mentioned above, where it always decreases. FIGS. 4(a) to 4(c) illustrate an example of a traditional learning rate update schedules (FIGS. 4(a) and 4(b)), and also cyclical update schedule (FIG. 4(c)).

In example implementations, the following cosine cyclic annealing learning rate schedule is stated. The top trained learner based on validation accuracy in each update cycle is saved, i.e., top M snapshots of trained learners are recorded during the training procedure.

$$lr(t) = \frac{lr_0}{2}\left(\cos\left(\pi\frac{\mod\left(t-1, \left\lceil\frac{T}{M}\right\rceil\right)}{\left\lceil\frac{T}{M}\right\rceil}\right) + 1\right),$$

in which,
$lr_0$ is the initial learning rate
$lr(t)$ is the learning rate at iteration t
t is the iteration number
T is the total iteration number
M is the snapshots number It should be noted that each mini batch refers to one iteration, while each epoch refers to one cycle of the whole training batch. Thus, each epoch can consist of multiple iterations.

Figure 5:
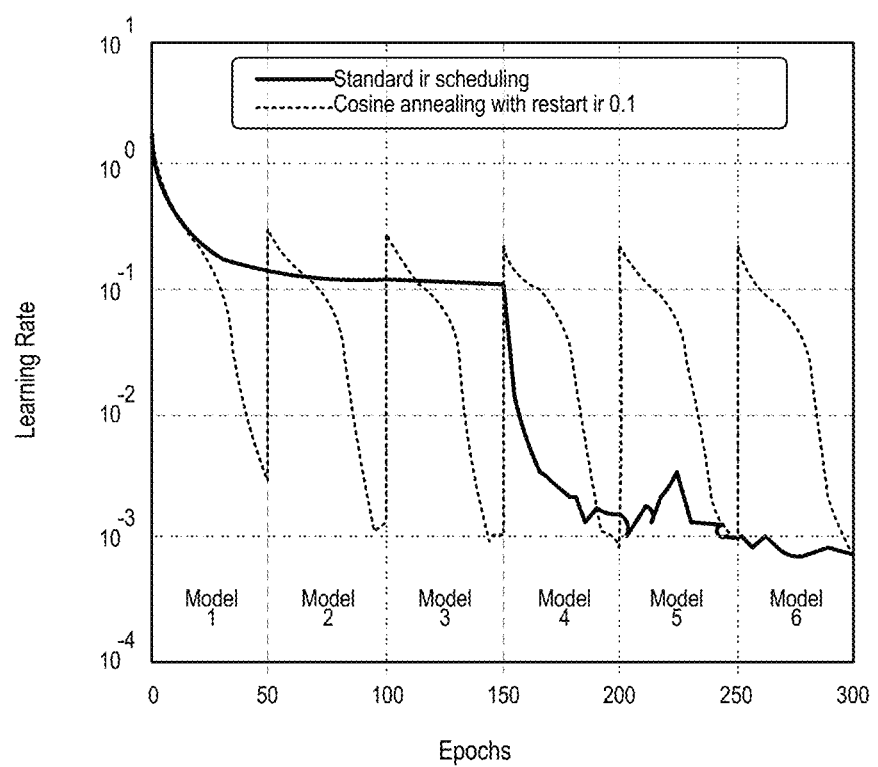
FIG. 5 illustrates an example of the update schedule using the cosine cyclic annealing learning rate versus traditional update schedule.

Using the cosine cyclic annealing learning rate, the update schedule versus traditional update schedule is shown in FIG. 5.

Figure 6:
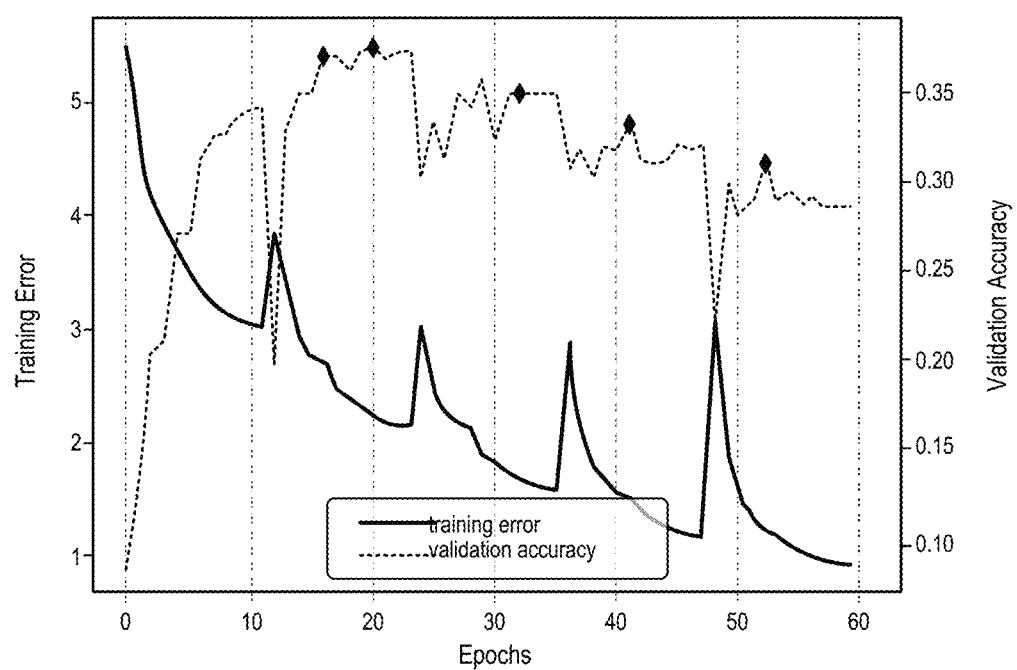
FIG. 6 illustrates an example of trained learners sampled using Snapshot-A method, in accordance with an example implementation.

An example of trained learners sampled using Snapshot-A method is shown in FIG. 6. For the CIFAR-10 dataset, examples described herein involve five trained learners using the Snapshot-A method.

Figure 7:
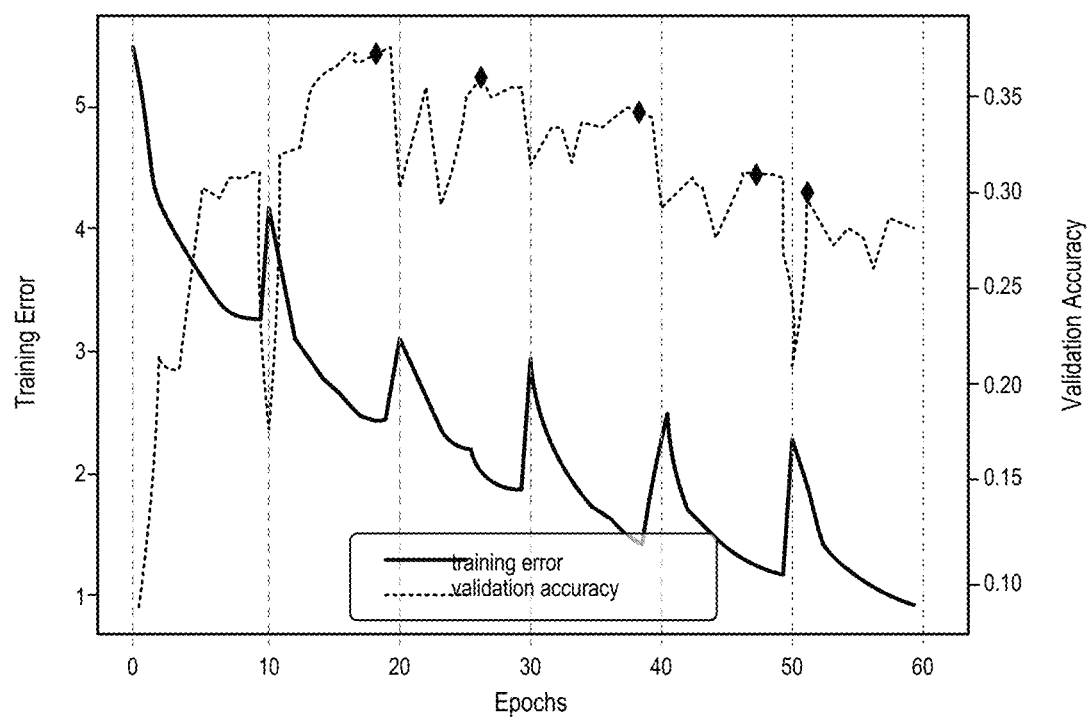
FIG. 7 illustrates an example of models saved using Snapshot-B method, in accordance with an example implementation.

Method 2 (Snapshot-B): Snapshot-B is a variant of Snapshot-A, where the update schedule is based on epoch rather than an iteration. Similar to Snapshot-A, in this method the best model during each update cycle is saved based on the validation accuracy. An example of models saved using Snapshot-B method is illustrated in FIG. 7.

Figure 8:
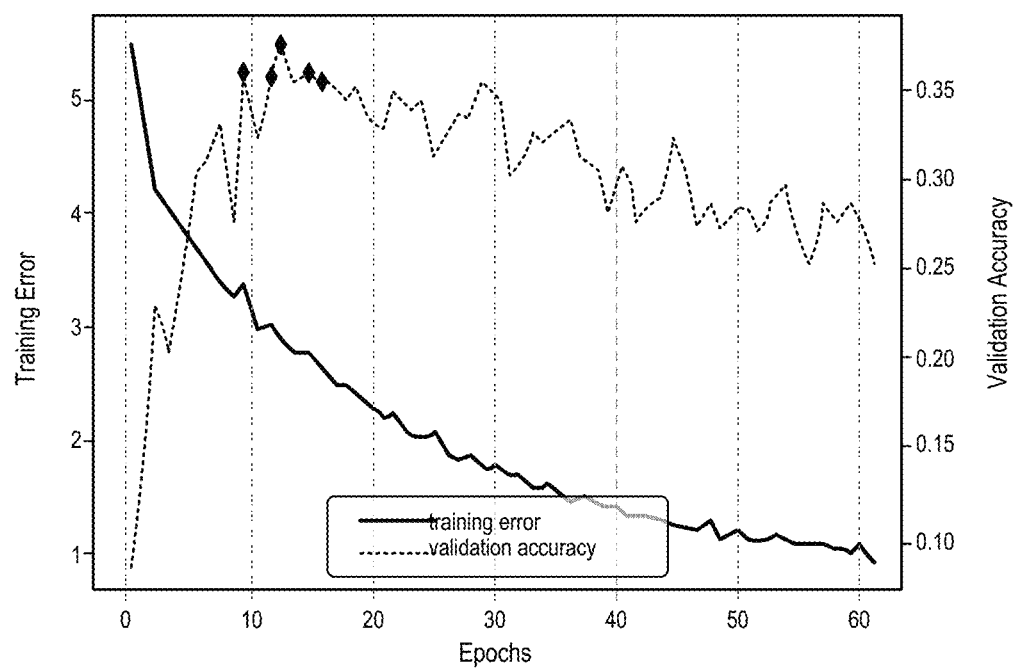
FIG. 8 illustrates an example of trained learners saved using Snapshot-C method based on exponential decay of the learning rate, in accordance with an example implementation.

Method 3 (Snapshot-C): In Snapshot-C method, the cosine cyclic annealing learning rate update schedule is not applied. Instead the traditional decreasing learning update schedule (e.g., step decay, exponential decay) is applied. However, the top-M trained learners are saved, where M is the number of desired trained learner components. An example of trained learners saved using Snapshot-C method based on exponential decay of the learning rate is shown in FIG. 8. For the CIFAR-10 dataset, the examples herein save the top five trained learner components using Snapshot-C method using step-decay method.

In summary for the CIFAR-10 dataset we have sampled trained learner components using the combination shown in Table 3 below.

TABLE 3

Snapshot Strategy for CIFAR-10 Dataset

| Method | Update Schedule Type | Update Cycle | Snapshot Strategy | # of Components (M) |
|---|---|---|---|---|
| Snapshot-A | Cosine cyclic | Per iteration | Save best per update cycle | 5 |
| Snapshot-B | Cosine cyclic | Per epoch | Save best per update cycle | 5 |
| Snapshot-C | Step | Per epoch | Save top-M | 5 |

Ensemble Component Creation During Inference

Example implementations as described above involve methodologies to obtain trained learner components of the ensemble during the model training procedure. In general, a trained learner obtained after a training procedure has the potential to generate more learner components during the inference phase.

A training procedure results into a deterministic trained learner during the inference phase. This is because the dropout is kept inactive during the inference phase. Each trained learner can be modified to a stochastic one by keeping the dropout active during the inference phase. Thus, when an input is passed multiple number of times through the trained learner with dropout active, the network structure is modified randomly during each pass and different outputs can be obtained. Each randomly modified structure of the trained learner is a component of the ensemble.

One has the option to use trained learner components obtained using the examples above, and during inference phase by keeping dropout generate more trained learner components. One also has the option to not use trained learner components using the examples above, and instead use traditional method of generating a single trained learner and generate trained learner components during the inference phase by keeping dropout active depending on the desired implementation. For the CIFAR-10 dataset, the examples trained a single trained learner using the traditional model training method and generated five components by keeping the dropouts active.

Ensemble Creation

The trained learner components created in the examples above when combined together creates an ensemble. During inference, each input is passed through each of the components and a prediction probability vector $s_{tj}$ is created where $S_{tj}$ is the probability vector for input $I_t$ and component j. Thus, using the methodologies stated above, for the CIFAR-10 dataset, examples generated the following trained learner components forming an ensemble of 35 components:

Random splitting of training dataset: five components
Random variation in hyper-parameters: five components
Random variation in model initializations: five components Snapshot-A: five components
Snapshot-B: five components
Snapshot-C: five components
Dropout activation during inference: five components Thus, when an input image in passed to the ensemble, 35 probability vectors are generated.

Combining Trained Learner Component Outputs

The final step in the example implementations described herein is combining component outputs into a single prediction output. Traditional aggregation mechanisms to combine outputs from an ensemble are applied. These techniques include but are not limited to the following:

Averaging: All the probability vectors obtained from each component are combined by calculating the mean/average. The resultant probability vector is then used to obtain the final predictions. Taking the argmax will give the top-1 predicted class. Similarly, using the final probability vector can give top-k classes if desired. For example, in repair recommendation, using the final probability the top-3 can be obtained forming three desired recommendations. In the case of CIFAR-10, the examples used only top-1 as the final prediction output.

Weighted averaging: The validation dataset when passed through each trained learner component results in an estimation of accuracy/performance. When the performances of all the models are normalized, it results into the weights of each model. The average of the product of these weights and the corresponding probability vector results in the resulting weighted average probability vector. Using this, the top-k prediction class is obtained.

Voting: For each top-k prediction, the class associated with maximum votes across all components in the ensemble is considered as the prediction.

Weighted voting: Similar to weighted averaging, the weights of each trained learner component is calculated using the performance metrics obtained using validation dataset. Subsequently voting is conducted on the product of the weights and the probability vector of trained learner components to obtain the final predictions.

In experimental results, to study improvements in reproducibility the metrics defined above are used. As an example, consider an example involving three single trained learners of a model using the traditional model training procedure. When an input is passed through the three trained learners a prediction output is obtained. Using the metrics defined above, the reproducibility scores can be obtained. Similarly, instead of single trained learners, in an example of three different ensembles of trained learners obtained using the example implementations, by using the metrics defined above the reproducibility across the ensembles can be obtained. The same applies for accuracy as well.

In the case of CIFAR-10, the following results were obtained for reproducibility and accuracy. The results were obtained between three single learners and three ensemble learners (where each ensemble learner has 35 components).

Accuracy:
Single learner accuracy: 90.26%
Ensemble accuracy: 93.49%
Reproducibility:
Exact reproducibility across 3 single learners: 89.13%
Exact reproducibility across 3 ensembles: 96.76%

Similar observations were made for Coarse-Reproducibility, Correct-Reproducibility. The above results are obtained where the dataset is balanced, i.e., in the case of CIFAR-10 6000 images per class. Across various experiments, it was observed that the above results held in the case of an imbalanced dataset. The accuracy and reproducibility results for imbalanced dataset are as follows:

Accuracy:
Single learner accuracy: 85.84%
Ensemble accuracy: 89.44%
Reproducibility:
Exact reproducibility across 3 single learners: 85.38%
Exact reproducibility across 3 ensembles: 95.24%

Mathematical Proof of Reproducibility Using Ensembles

Assume that classification problem has p class labels, $C=\{C_1, C_2, \ldots, C_p\}$. Suppose there is an ensemble of m components trained learners, $\xi=\{SL_1, SL_2, \ldots, SL_m\}$, and there are n testing data points, $I=\{I_1, I_2, \ldots, I_n\}$. For a data point $I_t (1 \leq t \leq n)$, each component trained learner $SL_j (1 \leq j \leq m)$ will output a probability-vector, $s_{tj}=<S_{tj}^1, S_{tj}^2, \ldots, S_{tj}^p>$ where $\Sigma_{k=1}^p S_{tj}^k=1$. Combine the probability-vectors from m component learners $SL_j$ using a weight vector $w=<W_1, W_2, \ldots, W_m>$, $\zeta=f(w,\xi)$, where $W_j$ is the weight for $SL_j$. The copy of is denoted as $\tilde{\xi}=\{\widetilde{SL}_1, \widetilde{SL}_2, \ldots, \widetilde{SL}_m\}$. The true label vector for $I_t$ is denoted as $r_t=<R_t^1, R_t^2, \ldots, R_t^p>$ which is a one-hot vector. Other notations are presented as described herein.

Figure 9:
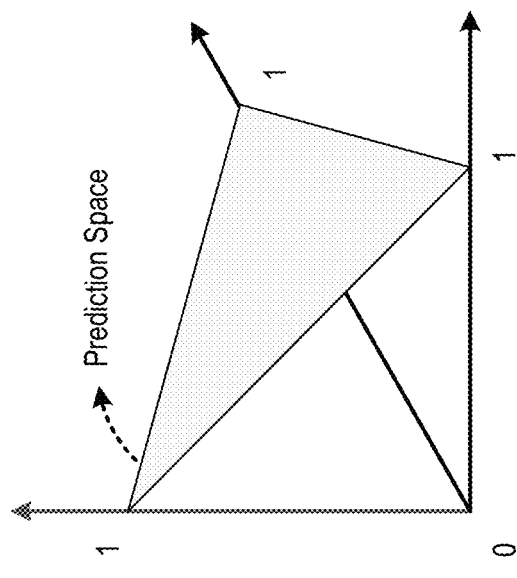
FIG. 9 shows the prediction probability space for 2-dimensional and 3-dimensional space.
Figure 9:
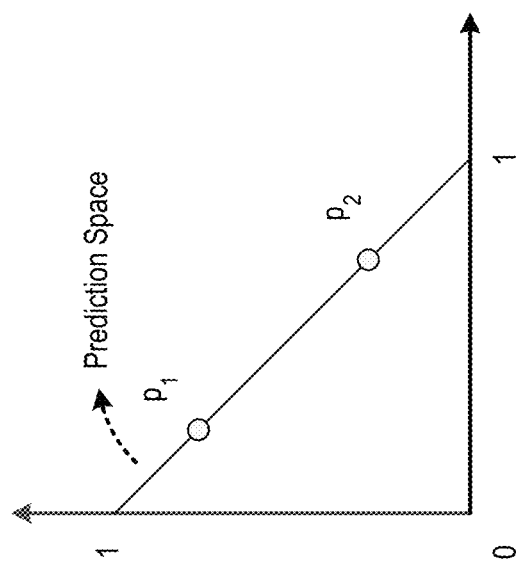

A p-dimensional Euclidean space is used to model the predictive vectors and ground truth vectors. FIG. 9 shows the prediction probability space for 2-dimensional and 3-dimensional space. As shown in FIG. 9, $s_{tj} (1 \leq j \leq m)$ in 2-dimensional space falls in the line between (0,1), (0,1) and in a 3-dimensional space falls in the triangle surface with vertices (1,0,0), (0,1,0), (0,0,1). Similarly, in p-dimensional space, it will fall in a (p−1)-dimensional space with vertices that are the columns vectors of the identity matrix, $I_{p-1}$. Assume the reproducibility of a model can be represented as the Euclidean distance between two predictive vectors. The distance between $s_{tj}$ and $\tilde{s}_{tj}$ is denoted as:

$$\text{distance } (s_{tj}, \tilde{s}_{tj}) = \sqrt{\sum_{k=1}^{p} (S_{tk}^k - \tilde{S}_{tj}^k)^2} \quad (1)$$

A smaller distance leads to a higher reproducibility. For reproducibility, higher is better.

Using the averaging as the aggregation method $\zeta$, i.e., $W_j=1$ for all $j(1 \leq j \leq m)$, the final probability-vector for $\zeta$ is represented by the centroid-point of the probability-vectors for all single learners in $\zeta$. For a given data point $I_t$, the mapping to the centroid-point vector is $o_t=<O_t^1, O_t^2, \ldots, O_t^p>$, where, $$o_t^k = \frac{1}{m}\sum_{j=1}^{m} S_{tj}(1 \leq k \leq p) \quad (2)$$

Theorem 1: For $I_t$, the distance between the centroid-vector $o_t$ and the centroid-vector $\tilde{o}_t$ is not greater than the average distance between a pair of probability-vectors ($s_{tj}$, $\tilde{s}_{tj}$) of all m component learners.

$$\text{distance } (o_t, \tilde{o}_t) \leq \frac{1}{m}\sum_{j=1}^{m} \text{distance}(s_{tj}, \tilde{s}_{tj}) \quad (3)$$

Proof: Based on Minkowski's inequality for sums:

$$\sqrt{\sum_{k=1}^{p}\left(\sum_{j=1}^{m}\theta_j^k\right)^2} \leq \sum_{j=1}^{m}\left(\sqrt{\sum_{k=1}^{p}(\theta_j^k)^2}\right) \quad (4)$$

Letting $\theta_j^k = S_{tj}^k - \tilde{S}_{tj}^k$ and substituting in Eq. 4

$$\sqrt{\sum_{k=1}^{p}\left(\sum_{j=1}^{m}(s_{tj}^k - \tilde{s}_{tj}^k)\right)^2} \leq \sum_{j=1}^{m}\sqrt{\sum_{k=1}^{p}(s_{tj}^k - \tilde{s}_{tj}^k)^2} \quad (5)$$

Since m>0, the following is obtained $$\sqrt{\sum_{k=1}^{p}\left(m\frac{1}{m}\sum_{j=1}^{m}(S_{tj}^k - \tilde{S}_{tj}^k)\right)^2} \leq \sum_{j=1}^{m}\sqrt{(\sum_{k=1}^{p}(S_{tj}^k - \tilde{S}_{tj}^k)^2}$$

$$\Rightarrow m\sqrt{\sum_{k=1}^{p}\left(\frac{1}{m}\sum_{j=1}^{m}(S_{tj}^k - \tilde{S}_{tj}^k)\right)^2} \leq \sum_{j=1}^{m}\sqrt{(\sum_{k=1}^{p}(S_{tj}^k - \tilde{S}_{tj}^k)^2}$$

$$\Rightarrow \sqrt{\sum_{k=1}^{p}\left(\frac{1}{m}\sum_{j=1}^{m}S_{tj}^k - \frac{1}{m}\sum_{j=1}^{m}\tilde{S}_{tj}^k\right)^2} \leq \frac{1}{m}\sum_{j=1}^{m}\sqrt{\sum_{k=1}^{p}(S_{tj}^k - \tilde{S}_{tj}^k)^2}$$

Using Eq. 1 and 5, Eq. 3 can be proved.

Theorem 2: For $I_t$, let $\xi_l = \xi - SL_l$ $(1 \leq l \leq m)$ be a subset of ensemble $\xi$ without $SL_l$. Each $\xi_l$ has $o_{tl}$ as its centroid-vector. We have $$\text{distance}(o_t, \tilde{o}_t) \leq \frac{1}{m}\sum_{l=1}^{m}\text{distance}(o_{tl}, \tilde{o}_{tl}) \quad (6)$$

Proof: Since $o_t$ is the centroid-vector of all $o_{tl}$ vectors, assume $\xi_l$ as an individual component learner with probability-vector of $o_{tl}$, Eq. 6 holds for every $\xi_l$ according to Theorem 1.

Lower and upper bound of reproducibility: The lower bound for distance($o_t, \tilde{o}_t$) is 0 if the component learners of the ensemble learner can be exhaustive to cover all possible probability-vectors in predictive space. The upper bound (right side in Eq. 3) is constant for a given p-dimensional Euclidean space. For example, it is ⅓ for 2-dimensional space. Theorem 1 shows that the reproducibility of an ensemble model is higher or equal to the average reproducibility of all individual component learners. Theorem 2 can be generalized for any subset of $\xi$ with m−d, $(1 \leq d \leq m-1)$ component learners. It shows that the reproducibility of an ensemble model with m component learners is higher or equal to the average reproducibility of ensembles with m−d component leaners. Thus, a better reproducibility can be achieved if more component learners are combined.

However, if poor components are added to the ensemble, it will diminish the prediction accuracy. Example implementations add good components to the ensemble which will improve the reproducibility of the ensemble model as well as maintain (or improve) the prediction accuracy.

Theorem 1 and Theorem 2 hold true for all other ensemble aggregation techniques (e.g., weighted averaging).

Assume that a supervised classification problem has p class labels, $C=\{C_1, \ldots, C_p\}$. Consider an ensemble of m component trained single learners, $\xi=\{SL_1, \ldots SL_m\}$, and n testing data points, $I=\{I_1, \ldots, I_n\}$. For a data point $I_t(1 \le t \le n)$, a trained learner $SL_j(1 \le j \le m)$ outputs a prediction vector, $s_{tj}=\langle S_{tj}^1, \ldots, S_{tj}^p \rangle$ where $\Sigma_{k=1}^p S_{tj}^k=1$. The prediction vectors from m component learners are combined using a weight vector $w=\langle W_1, \ldots, W_m \rangle$, $\zeta=f(w,\xi)$, where $W_j$ is the weight for $SL_j$. The copy of $SL_j$ is denoted as $\widetilde{SL}_1$, similar to $\xi$, $\zeta$. The true label vector for $I_t$ is denoted as $r_t=\langle R_t^1, \ldots, R_t^p \rangle$, which is one-hot vector.

Represent the prediction and ground truth vectors in a p-dimensional space where they belong to the (p−1) dimensional probability simplex. FIG. 9 shows the prediction probability space for 2-dimensional and 3-dimensional space. FIG. 9 illustrates that $s_{tj}(1 \le j \le m)$ in 2-dimensional space falls on the line between (0,1), (1,0) and in a 3-dimensional space falls on the triangular surface with vertices (1,0,0), (0,1,0), (0,0,1). Similarly, in p-dimensional space, it will fall in a (p−1)-dimensional space with vertices that are the column vectors of the identity matrix, $I_{p-1}$. Consider consistency of a prediction is represented as the Euclidean distance between two prediction vectors in p-dimensional space, the distance between $s_{tj}$ and $\tilde{s}_{tj}$ is denoted as:

$$\text{distance}(s_{tj}, \tilde{s}_{tj}) = \sqrt{\sum_{k=1}^{p}\left(S_{tj}^k - \tilde{S}_{tj}^k\right)^2} \quad\quad 1$$

A smaller distance corresponds to a higher reproducibility and a higher reproducibility is better.

If averaging is used as the output combination method for $\zeta$, i.e. $W_j=1$ for all $j(1 \le j \le m)$, the final prediction vector for $\zeta$ is represented by the centroid-point of the prediction vectors of all single leaners in $\zeta$. Thus, for a given data point $I_t$, a mapping to the centroid-point vector, $o_t=\langle O_t^1, \ldots, O_t^p \rangle$ is obtained where, $$O_t^k = \frac{1}{m}\sum_{j=1}^{m} S_{tj}^k (1 \le k \le p) \quad\quad 2$$

Theorem 1: For $I_t$, the distance between the centroid-vectors $o_t$ and $\tilde{o}_t$ is not greater than the average distance between a pair of prediction vectors $(s_{tj},\tilde{s}_{tj})$ of m component learners.

$$\text{distance}(s_{tj}, \tilde{s}_{tj}) \le \frac{1}{m}\sum_{j=1}^{m}\text{distance}(s_{tj}, \tilde{s}_{tj}) \quad\quad 3$$

Proof: Based on Mikowski's inequality for sums:

$$\sqrt{\sum_{k=1}^{p}\left(\sum_{j=1}^{m}\theta_j^k\right)^2} \le \sum_{j=1}^{m}\sqrt{\sum_{k=1}^{p}(\theta_j^k)^2} \quad\quad 4$$

Letting or $\theta_j^k = S_{tj}^k - \tilde{S}_{tj}^k$ and substituting in Eq. 4.

$$\sqrt{\sum_{k=1}^{p}\left(\sum_{j=1}^{m}S_{tj}^k - \tilde{S}_{tj}^k\right)^2} \le \sum_{j=1}^{m}\sqrt{\sum_{k=1}^{p}\left((S_{tj}^k - \tilde{S}_{tj}^k)\right)^2} \quad\quad 5$$

Since m>0, we have the following $$\sqrt{\sum_{k=1}^{p}\left(m\frac{1}{m}\sum_{j=1}^{m}(S_{tj}^k - \tilde{S}_{tj}^k)\right)^2} \le \sum_{j=1}^{m}\sqrt{\sum_{k=1}^{p}(S_{tj}^k - \tilde{S}_{tj}^k)^2} \quad\quad 6$$

Using Eq. 1 and Eq.5, Eq.3 can be proved.

Theorem 2: For $I_t$, let $\xi_l = \xi - SL_1(1 \le l \le m)$ be a subset of ensemble $\xi$ without $SL_l$. If each $\xi_l$ has $o_{tl}$ as its centroid-vector. Then, $$\text{distance}(o_{tj}, \tilde{o}_{tj}) \le \frac{1}{m}\sum_{j=1}^{m}\text{distance}(o_{tj}, \tilde{o}_{tj}) \quad\quad 7$$

Lower and upper bound: The upper bound for distance $(o_t, \tilde{o}_t)$ is determined by $$\frac{1}{m}\sum_{j=1}^{m}$$

$\text{distance}(s_{tj}, \tilde{s}_{tj})$, while the lower bound is 0.

Theorem 1 shows that the reproducibility of an ensemble model is higher or equal to the average reproducibility of all individual component learners. Theorem 2 can be generalized for any subset of $\xi$ with m−d(1≤d≤m−1) component learners. It shows that the reproducibility of an ensemble model with m component learners is higher or equal to the average reproducibility of ensembles with m−d component learners. Thus, a better reproducibility can be achieved if more component learners are combined. However, adding components with large variance in predictions can diminish the ensemble reproducibility by increasing the upper bound in Eq. 3. Additionally, reproducibility in correct predictions—correct-reproducibility—is more desirable. A higher ensemble reproducibility can be achieved by components with small variance in predictions, however, this cannot guarantee a better reproducibility in correct predictions.

Consider the accuracy of a prediction can be represented as the Euclidean distance between the prediction vector $s_{tj}$ and ground truth vector $r_t$, denoted as $\text{distance}(s_{tj},r_t)=\sqrt{\Sigma_{k=1}^{p}(S_{tj}^k - R_t^k)^2}$. It can be proven that:

$$\text{distance}(o_{tj}, r_{tj}) \le \frac{1}{m}\sum_{j=1}^{m}\text{distance}(o_{tj}, \tilde{o}_{tj}) \quad\quad 8$$

Which shows that a better accuracy can be achieved by combining components with good prediction accuracy (i.e., decreasing the upper bound).

Let $$acc_\zeta = \frac{1}{n}\sum_{t=1}^n 1_{\zeta,r}^1(t) \text{ and } acc_{\tilde\zeta} = \frac{1}{n}\sum_{t=1}^n 1_{\tilde\zeta,r}^1(t)$$

denote the prediction accuracy for $\zeta$ and $\tilde\zeta$ for I, $$eaer(\zeta,\tilde\zeta) = \frac{1}{n}\sum_{t=1}^n 1_{\zeta,\tilde\zeta,r}(t)$$

denote the correct-producibility between $\zeta$ and $\tilde\zeta$, where $1_{\zeta,r}^1(t)$ and $1_{\zeta,\tilde\zeta,r}^1(t)$ are indicator functions defined in Section IV.A.

Theorem 3: For I, the correct-reproducibility between two learners eaer($\zeta,\tilde\zeta$) is not greater than the smaller of the two accuracy $acc_\zeta$ and $acc_{\tilde\zeta}$, and is no less than the minimum overlap between $acc_\zeta$ and $acc_{\tilde\zeta}$ $$\max(acc_\zeta + acc_{\tilde\zeta} - 1, 0) \leq eaer(\zeta,\tilde\zeta) \leq \min(acc_\zeta, acc_{\tilde\zeta}) \qquad 9$$

Proof: Let A and B be the subsets of I that are correctly predicted by $\zeta$ and $\tilde\zeta$. Then $$acc_\zeta = \frac{|A|}{n},$$

$$acc_{\tilde\zeta} = \frac{|B|}{n},$$

$$\text{and } eaer(\zeta,\tilde\zeta) = \frac{|A \cap B|}{n}.$$

Since $|A|+|B|-|A \cap B|=|A \cup B| \leq n$, we have $$\frac{|A|}{n} + \frac{|B|}{n} - 1 \leq \frac{|A \cap B|}{n},$$

i.e. $(acc_\zeta + acc_{\tilde\zeta} - 1 \leq eaer(\zeta,\tilde\zeta)$. And we always have $0 \leq eaer(\zeta,\tilde\zeta)$. So, the left inequality is thereby proven. Now notice that $|A \cap B| \leq |A|$ and $|A \cap B| \leq |B|$, the right inequality is thereby proven.

Theorem 3 shows that increasing the prediction accuracy of a model can improve the correct-reproducibility of the model by increasing the lower bound and upper bound in Eq. 9. According to Eq.8 and Eq.9, combining a component with a higher prediction accuracy can yield a higher ensemble accuracy, thus resulting in a higher correct-reproducibility of the ensemble learner.

Example implementations can be applied to applications which require prediction of failures, recommending repair actions, defect identification and other predictive maintenance activities for either components of the system or a system as a whole.

Figure 10:
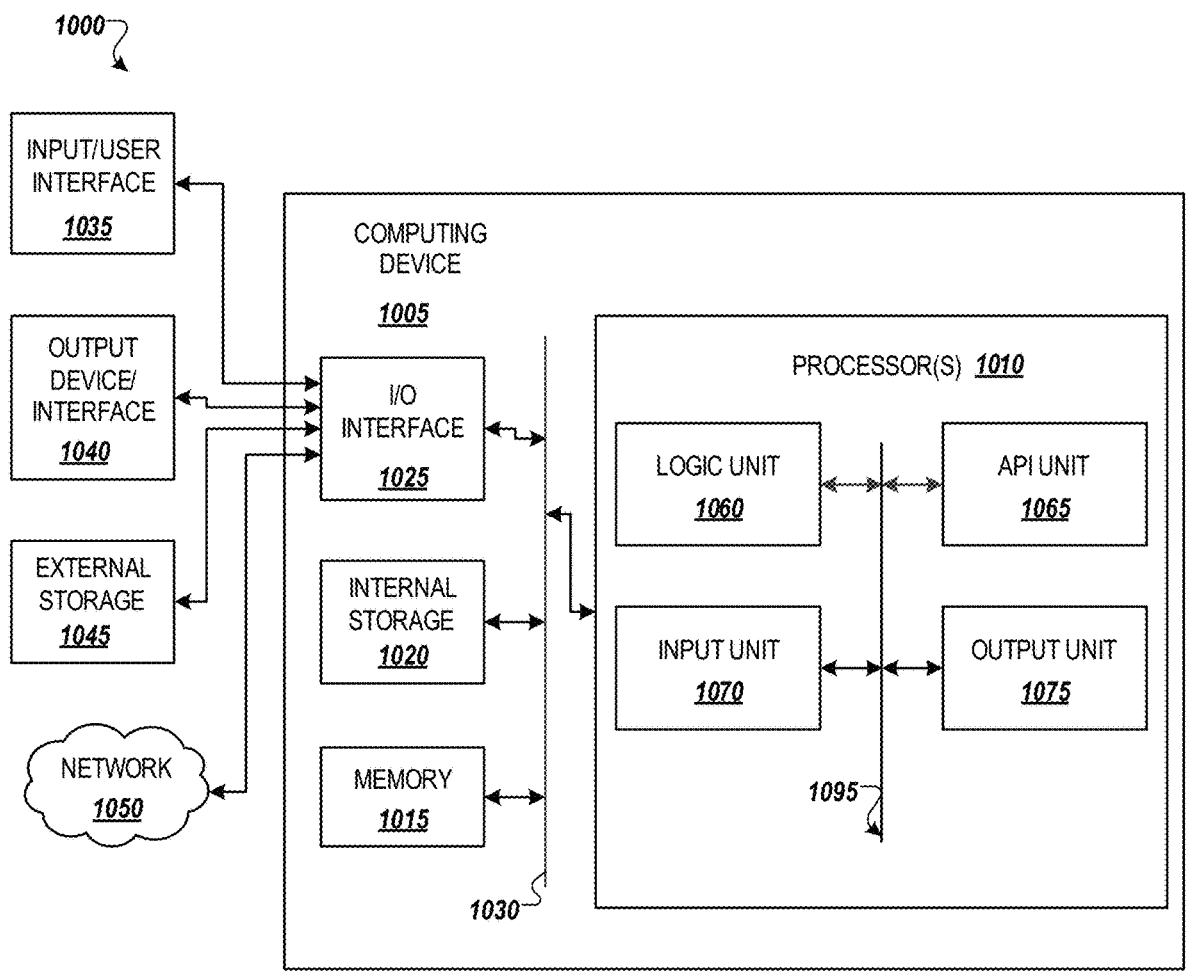
FIG. 10 illustrates an example computing environment with an example computer device suitable for use in some example implementations.

FIG. 10 illustrates an example computing environment with an example computer device suitable for use in some example implementations, such as an apparatus configured to generate an ensemble of deep learning or neural network models. Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or IO interface 1025, any of which can be coupled on a communication mechanism or bus 1030 for communicating information or embedded in the computer device 1005. IO interface 1025 is also configured to receive images from cameras or provide images to projectors or displays, depending on the desired implementation.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via IO interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

IO interface 1025 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or in a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

Processor(s) 1010 can be configured to, for a training set of data, generate a plurality of model samples for the training set of data, the plurality of model samples generated from deep learning or neural network methods; and aggregate output of the model samples to generate an output of the ensemble models as illustrated in FIGS. 1 to 3.

Processor(s) 1010 can be configured to generate the plurality of model samples for the training set of data by executing a distributed training process during a training phase of the plurality of model samples, the distributed training process training each of the plurality of model samples across separate servers, each of the separate servers configured to generate a model sample as described herein.

Processor(s) 1010 can be configured to generate the plurality of model samples for the training set of data by: executing an inference process on the plurality of model samples to generate additional model samples through passing inputs on the plurality of model samples; employing a dropout process on the plurality of model samples and the additional model samples to obtain a subset of model samples as the plurality of model samples, the dropout process configured to reduce the plurality of model samples and the additional model samples to the subset of the model samples based on validation accuracy against the training set of data as illustrated in FIG. 3.

Processor(s) 1010 wherein the plurality of model samples are predictive maintenance models, and wherein the output is a maintenance recommendation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method of generating an ensemble of deep learning or neural network models, the method comprising:
for a training set of data:
generating a plurality of model samples for the training set of data, the plurality of model samples generated from deep learning or neural network methods; and
aggregating output of the model samples to generate an output of the ensemble models,
wherein the generating the plurality of model samples for the training set of data comprises:
executing an inference process on the plurality of model samples to generate additional model samples through passing inputs on the plurality of model samples; and
employing a dropout process on the plurality of model samples and the additional model samples to obtain a subset of model samples as the plurality of model samples, the dropout process configured to reduce the plurality of model samples and the additional model samples to the subset of the model samples based on validation accuracy against the training set of data.

2. The method of claim 1, wherein the generating the plurality of model samples for the training set of data further comprises executing a distributed training process during a training phase of the plurality of model samples, the distributed training process training each of the plurality of model samples across separate servers, each of the separate servers configured to generate a model sample.

3. The method of claim 1, wherein the plurality of model samples are predictive maintenance models, and wherein the output is a maintenance recommendation.

4. A non-transitory computer readable medium, storing instructions of generating an ensemble of deep learning or neural network models, the instructions comprising:
for a training set of data:
generating a plurality of model samples for the training set of data, the plurality of model samples generated using sampling of trained learners generated from deep learning or neural network methods; and
aggregating output of the model samples to generate an output of the ensemble models,
wherein generating the plurality of model samples for the training set of data comprises:
executing an inference process on the plurality of model samples to generate additional model samples through passing inputs on the plurality of model samples; and
employing a dropout process on the plurality of model samples and the additional model samples to obtain a subset of model samples as the plurality of model samples, the dropout process configured to reduce the plurality of model samples and the additional model samples to the subset of the model samples based on validation accuracy against the training set of data.

5. The non-transitory computer readable medium of claim 4, wherein the generating the plurality of model samples for the training set of data further comprises executing a distributed training process during a training phase of the plurality of model samples, the distributed training process training each of the plurality of model samples across separate servers, each of the separate servers configured to generate a model sample.

6. The non-transitory computer readable medium of claim 4, wherein the plurality of model samples are predictive maintenance models, and wherein the output is a maintenance recommendation.

7. An apparatus configured to generate an ensemble of deep learning or neural network models, the apparatus comprising:
a processor, configured to:
for a training set of data:
generate a plurality of model samples for the training set of data, the plurality of model samples generated from deep learning or neural network methods; and
aggregate output of the model samples to generate an output of the ensemble models,
wherein the processor is configured to generate the plurality of model samples for the training set of data by,
executing an inference process on the plurality of model samples to generate additional model samples through passing inputs on the plurality of model samples; and
employing a dropout process on the plurality of model samples and the additional model samples to obtain a subset of model samples as the plurality of model samples, the dropout process configured to reduce the plurality of model samples and the additional model samples to the subset of the model samples based on validation accuracy against the training set of data.

8. The apparatus of claim 7, wherein the processor is configured to generate the plurality of model samples for the training set of data by further executing a distributed training process during a training phase of the plurality of model samples, the distributed training process training each of the plurality of model samples across separate servers, each of the separate servers configured to generate a model sample.

9. The apparatus of claim 7, wherein the plurality of model samples are predictive maintenance models, and wherein the output is a maintenance recommendation.

* * * * *